(12) United States Patent
Boss et al.

(10) Patent No.: US 11,436,470 B2
(45) Date of Patent: Sep. 6, 2022

(54) GENERATING SIMULATED IMAGE TRAINING DATA

(71) Applicant: KYNDRYL, INC., New York, NY (US)

(72) Inventors: Gregory J. Boss, Saginaw, MI (US); Tamer E. Abuelsaad, Yorktown, NY (US); Randy A. Rendahl, Raleigh, NC (US); John E. Moore, Jr., Pflugerville, TX (US)

(73) Assignee: KYNDRYL, INC., New York, NY (US)

( * ) Notice: Subject to any disclaimer, the term of this patent is extended or adjusted under 35 U.S.C. 154(b) by 591 days.

(21) Appl. No.: 16/569,719

(22) Filed: Sep. 13, 2019

(65) Prior Publication Data

US 2021/0081751 A1    Mar. 18, 2021

(51) Int. Cl.
*G06N 3/00* (2006.01)
*G06K 9/62* (2022.01)
*G06N 3/08* (2006.01)

(52) U.S. Cl.
CPC .......... *G06N 3/008* (2013.01); *G06K 9/6257* (2013.01); *G06K 9/6264* (2013.01); *G06N 3/08* (2013.01)

(58) Field of Classification Search
CPC .. G06K 9/00; G06K 9/00496; G06K 9/00503; G06K 9/0051; G06K 9/00516; G06K 9/00523; G06K 9/00536; G06K 9/00543; G06K 9/0055; G06K 9/00557; G06K 9/00563; G06K 9/0057; G06K 9/62; G06K 9/6201; G06K 9/6215; G06K 9/6217; G06K 9/6218; G06K 9/6219; G06K 9/622; G06K 9/6221; G06K 9/6222; G06K 9/6223; G06K 9/6224; G06K 9/6226;
(Continued)

(56) References Cited

U.S. PATENT DOCUMENTS 10,007,928 B2    6/2018 Graham et al.
10,015,124 B2    7/2018 McGregor, Jr. et al.
(Continued)

FOREIGN PATENT DOCUMENTS

CN    102553250 A    7/2012
RU    175309 U1    11/2017

OTHER PUBLICATIONS

"Cognitive assisted deblur enhancement for images restoration", An IP.com Prior Art Database Technical Disclosure, Authors et al.: Disclosed Anonymously, IP.com No. IPCOM000250109D, IP.com Electronic Publication Date: Jun. 1, 2017, 5 pages.
(Continued)

*Primary Examiner* — Adam R Mott
*Assistant Examiner* — Erick T. Detweiler
(74) *Attorney, Agent, or Firm* — Tutunjian & Bitetto, P.C.; Erik Swanson

(57) ABSTRACT

Generating image training data for training an autonomous photography agent to learn the preferences and photo-taking styles of a given set of human users. The preferences and/or photo-taking styles include, but are not necessarily limited, to: (i) human users of a certain age group (such as toddlers or adults); (ii) profession of the photo-taker (professional photographer rather than a hobbyist); (iii) health status of the photo-taker; and/or (iv) travel status of the photo-taker (such as a tourist in a new city rather than a resident of a given city).

18 Claims, 7 Drawing Sheets

(58) Field of Classification Search
CPC .. G06K 9/6227; G06K 9/6228; G06K 9/6229; G06K 9/623; G06K 9/6231; G06K 9/6232; G06K 9/6234; G06K 9/6235; G06K 2009/6236; G06K 2009/6237; G06K 2009/6238; G06K 9/624; G06K 9/6242; G06K 9/6243; G06K 9/6244; G06K 9/6245; G06K 9/6246; G06K 9/6247; G06K 9/6248; G06K 9/6249; G06K 9/6251; G06K 9/6252; G06K 9/6253; G06K 9/6254; G06K 9/6255; G06K 9/6256; G06K 9/6257; G06K 9/6259; G06K 9/626; G06K 9/6261; G06K 9/6262; G06K 9/6263; G06K 9/6264; G06K 9/6265; G06K 9/6267; G06K 9/6268; G06K 9/6269; G06K 9/627; G06K 9/6271; G06K 9/6272; G06K 9/6273; G06K 9/6274; G06K 9/6276; G06K 9/6277; G06K 9/6278; G06K 9/6279; G06K 9/628; G06K 9/6281; G06K 9/6282; G06K 9/6284; G06K 9/6285; G06K 9/6286; G06K 9/6287; G06K 9/6288; G06K 9/6289; G06K 9/629; G06K 9/6292; G06K 9/6293; G06K 2009/6294; G06K 2009/6295; G06K 9/6296; G06K 9/6297; G06K 9/6298; G06N 3/00; G06N 3/004; G06N 3/006; G06N 3/008; G06N 3/02; G06N 3/04; G06N 3/0469; G06N 3/0418; G06N 3/0427; G06N 3/0436; G06N 3/0445; G06N 3/0454; G06N 3/0463; G06N 3/0472; G06N 3/0481; G06N 3/049; G06N 3/06; G06N 3/061; G06N 3/063; G06N 3/0635; G06N 3/067; G06N 3/0675; G06N 3/08; G06N 3/082; G06N 3/084; G06N 3/086; G06N 3/088; G06N 3/10; G06N 3/105; G06N 5/00; G06N 5/003; G06N 5/006; G06N 5/02; G06N 5/022; G06N 5/025; G06N 5/027; G06N 5/04; G06N 5/041; G06N 5/042; G06N 5/043; G06N 5/045; G06N 5/046; G06N 5/047; G06N 5/048; G06N 7/00; G06N 7/005; G06N 7/02; G06N 7/023; G06N 7/026; G06N 7/04; G06N 7/043; G06N 7/046; G06N 7/06; G06N 7/08; G06N 20/00; G06N 20/10; G06N 20/20; G06N 99/00; H04N 5/23222
See application file for complete search history.

(56) References Cited

U.S. PATENT DOCUMENTS

| | | | |
|---|---|---|---|
| 10,694,097 B1* | 6/2020 | Shirakyan | G06V 40/103 |
| 2018/0267998 A1 | 9/2018 | Albouyeh | |
| 2019/0174056 A1* | 6/2019 | Jung | H04N 1/00244 |
| 2020/0077016 A1* | 3/2020 | Shanmugam | H04N 5/23206 |

OTHER PUBLICATIONS

"Image Moderation Using Machine Learning", An IP.com Prior Art Database Technical Disclosure, Authors et al.: Disclosed Anonymously, IP.com No. IPCOM000252007D, IP.com Electronic Publication Date: Dec. 13, 2017, 35 pages.

"Receiving Device Instructions from One User to Be Overlaid on an Image or Video of the Device for Another User", An IP.com Prior Art Database Technical Disclosure, IP.com No. IPCOM000207134D, IP.com Electronic Publication Date: May 17, 2011, 21 pages.

"System and Method for adaptive recommendation of background for clicking image, along with identification of person and camera position", An IP.com Prior Art Database Technical Disclosure, Authors et al.: Disclosed Anonymously, IP.com No. IPCOM000254710D, IP.com Electronic Publication Date: Jul. 24, 2018, 6 pages.

Dodge et al., "Understanding How Image Quality Affects Deep Neural Networks", Apr. 21, 2016, 6 pages.

Huang, et al., "An Introduction to Image Synthesis with Generative Adversarial Nets", Nov. 17, 2018, 17 pages.

* cited by examiner

UNCORRECTED PERSPECTIVE

SHIFTED PERSPECTIVE

GENERATING SIMULATED IMAGE TRAINING DATA

BACKGROUND

The present invention relates generally to the field of generating training data for use in artificial intelligence (AI) systems.

The concept of "training data" or a "training dataset" is known. As of Jul. 22, 2019, the Wikipedia entry on "Training, validation, and test sets" states as follows: "In machine learning, a common task is the study and construction of algorithms that can learn from and make predictions on data. Such algorithms work by making data-driven predictions or decisions, through building a mathematical model from input data. The data used to build the final model usually comes from multiple datasets . . . . The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset." (footnote omitted) (emphasis in original).

SUMMARY

According to an aspect of the present invention, there is a computer-implemented method, computer program product and/or computer system that performs the following operations (not necessarily in the following order): (i) receiving a class information data set including information indicative of a set of personal characteristic parameter value range(s) for a class of humans, with the personal characteristic parameter value range(s) respectively corresponding to a plurality of personal characteristic parameters; (ii) receiving a photographic images data set including: (a) a plurality of photographic images captured by human(s), and (b) for each given photographic image, a set of personal characteristic parameter value(s) characterizing the photographer who captured the given photographic image, with the set of personal characteristic parameter value(s) respectively corresponding to the plurality of personal characteristic parameter value(s); (iii) selecting a plurality of training images from the plurality of photographic images, with the selection being based upon the personal characteristic parameter value range(s) and the personal characteristic parameter value(s) respectively associated with the photographic images; (iv) generating human-emulating machine logic for controlling a photographic robot to capture human-emulating photographic images that emulate photographs that would tend to be taken by humans characterized by the personal characteristic parameter value range(s); (v) configuring the photographic robot with the human-emulating machine logic; and (vi) capturing, by photographic robot, a first human-emulating photographic image under control of the human-emulating machine logic.

DETAILED DESCRIPTION

Figure 1:
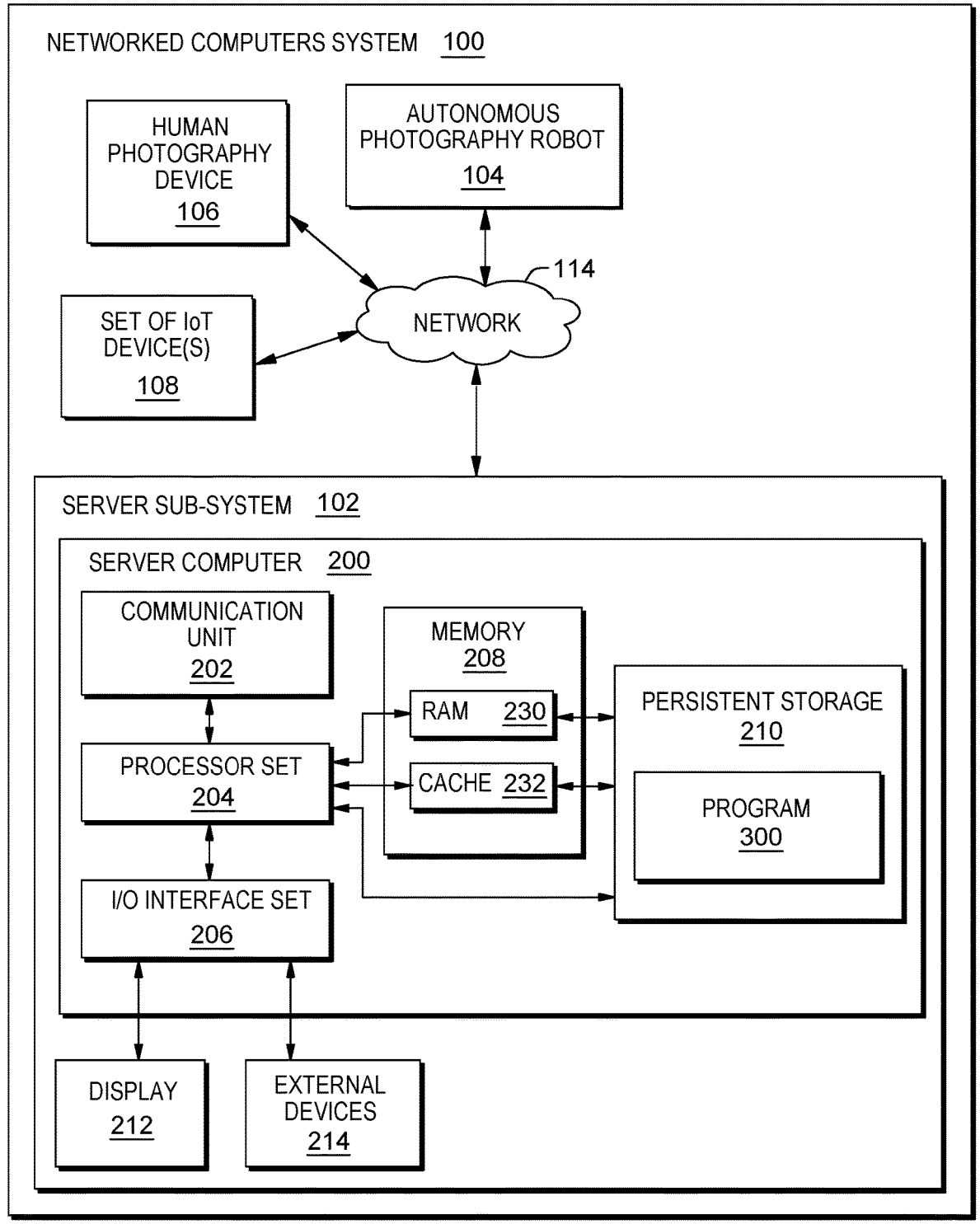
FIG. 1 is a block diagram view of a first embodiment of a system according to the present invention.

Some embodiments of the present invention are directed to generating image training data for training an autonomous photography agent to learn the preferences and photo-taking styles of a given set of human users. The preferences and/or photo-taking styles include, but are not necessarily limited to, human users of a certain age group (such as toddlers or adults), profession (professional photographers rather than a hobbyist), health status, and/or travel status (such as a tourist going on a trip rather than a resident of a given city).

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; autonomous photography robot 104; human photography device 106; set of IoT (Internet of Things) device(s) 108; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
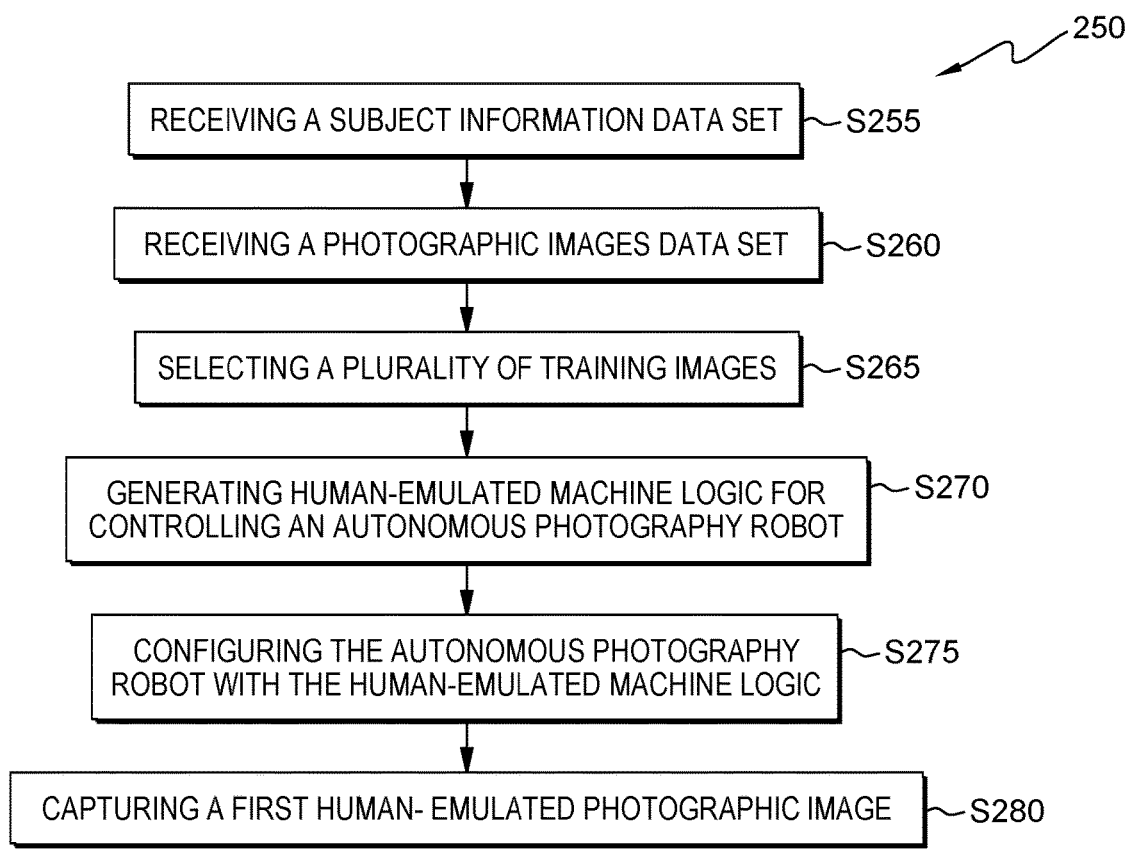
FIG. 2 is a flowchart showing a first embodiment method performed, at least in part, by the first embodiment system.
Figure 3:
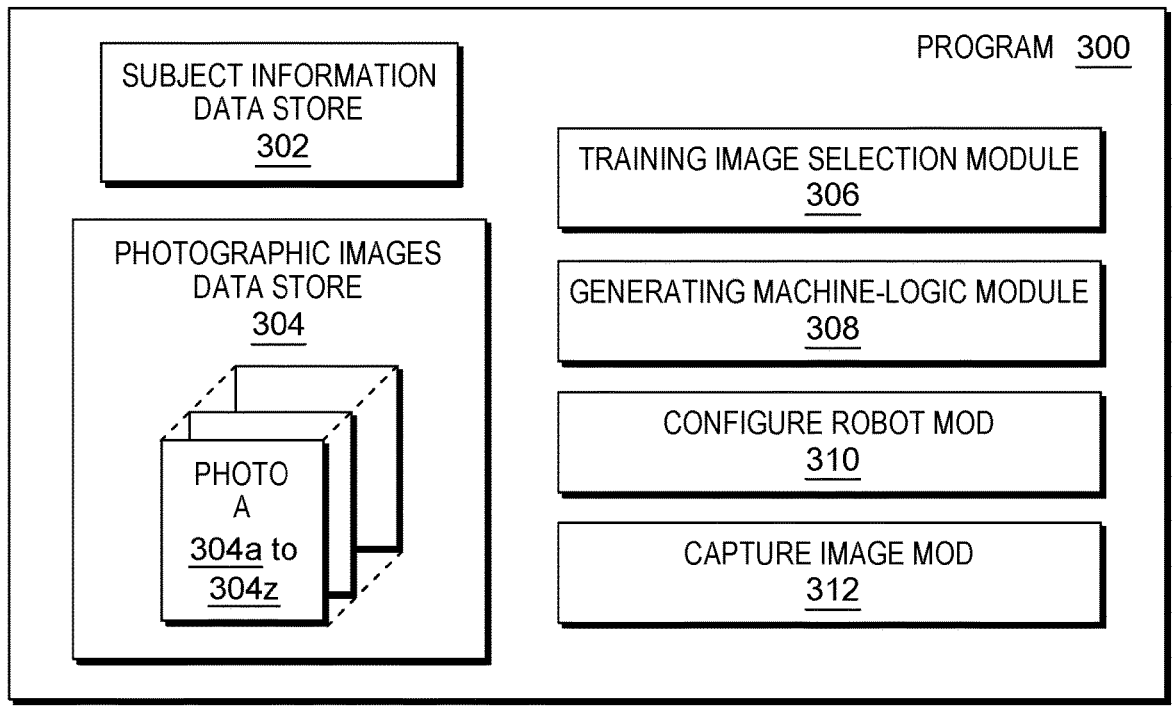
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where a first subject information data set is received from subject information data store 302. As used in this example, the term "subject" refers to a set of human photographer(s), each of whom have varying personal characteristics. These personal characteristics includes height, weight, health status, years of experience in photography, geographic location of residence, etc. The first subject information data set includes information about personal characteristic parameter value(s) for each of the human photographer(s) in the set of human photographer(s). For example, in the case of a first photographer (Photographer A), the first subject information data set would be as follows: (i) height: five feet, nine inches (5'9"); (ii) weight: 170 pounds; (iii) health status: normal health; (iv) years of experience in photography: three years; and (v) geographic residence: New York, N.Y.

Alternatively, the first subject information data set can include personal characteristic parameter value ranges, rather than single discrete values, for a given set of photographers. For example, for Photographers A to Photographers E, the first subject information data set would be as follows: (i) height: five feet, five inches to five feet, nine inches (5'5"-5'9"); (ii) weight: 170 to 220 pounds; (iii) health status: normal health; (iv) years of experience in photography: three to five years; and (v) geographic residence: Northeast United States.

Processing proceeds to operation S260, where a first photographic images data set is received from photographic images data store 304, with photographic images data store including photographic images 304a to 304z. It is noted that in some embodiments, there can be more than twenty-six (26) photographic images in the photographic images data store, however in this example, twenty-six photographic images are shown for illustrative purposes. In some embodiments, photographic images 304a to 304z are taken by a human user (not shown) by human photography device 106 (shown in FIG. 1), sent through communication network 114, and to photographic information data store 304.

Human photography device 106 can be any camera that is capable of transmitting (wired or wirelessly) photographs from the physical data store inside the camera to any external source that is capable of receiving these photographs. Typically, human photography device 106 can be any of the following camera types: compact digital camera, digital SLR (single-lens reflex) camera, mirrorless camera, action camera, 360 camera, film camera, or the like.

Processing proceeds to operation S265, where training image selection module ("mod") 306 selects a plurality of training images from the first photographic images data set. In this example, the plurality of training images selected from the first photographic images data set is a sufficiently large number of training images so that generating new image training data in would produce valid results (that is, the newly-generated image training data would be able to properly label and/or classify new image data).

Processing proceeds to operation S270, where generating machine-logic mod 308 generates human-emulated machine logic for controlling autonomous photography robot 104 (shown in FIG. 1). In one embodiment of the present invention, autonomous photography robot 104 is a camera platform that allows configuration of a set of photo-taking characteristics. These photo-taking characteristics include: tilt, focus, zoom, positioning with respect to the subject of the photograph, shake (or other physical motions), and other behaviors that can simulate variations that would normally affect human photography.

In order for autonomous photography robot 104 to replicate the photo-taking skills of a given human user with a given set of personal characteristics, there needs to be a set of rules that robot 104 can follow to accurately reproduce the quality of a photo taken by the given human user.

For example, if the given human user is a toddler that is four years old, it is likely that the toddler does not take high quality photographs (that is, the photograph taken may not show the subject of the photo as blurry and off-axis). In this example, a first human-emulated machine-logic rule would be as follows:
Tilt the Camera by 30 Degrees to the Right and do not Focus in on the Subject Alternatively, if the given human user is Photographer A (from above) who has three years of experience in photography, a second human-emulated machine-logic rule would be as follows:
Ensure that the Camera is Perfectly Parallel to the Horizon and Focus in on the Subject Processing proceeds to operation S275, where configure robot mod 310 configures autonomous photography robot 104 with the human-emulated machine logic that was generated in operation S270. Continuing from the example using the first human-emulated machine-logic rule, above, autonomous photography robot 104 is configured with this rule so that the physical mechanisms of the robot can: (i) tilt the camera by 30 degrees, and (ii) ensures that the subject of the photograph is blurred. Continuing from the example using the second human-emulated machine-logic rule, above, autonomous photography robot 104 is configured with this rule so that the physical mechanisms of the robot can: (i) keep the camera perfectly parallel to the horizon, and (ii) correctly focuses on the subject of the photograph so that the subject appears clear and not blurred.

Processing proceeds to operation S280, where capture image mod 312 sends instructions to autonomous photography robot 104, through communication network 114, to capture a first set of human-emulated photographic image(s). After autonomous photography robot 104 captures the first set of human-emulated photographic image(s), metadata is created for the captured image(s). This metadata includes information including: (i) time the image was captured; (ii) location where the image was captured; (iii) physical characteristic value(s) of the subject for whom the human-emulation was performed; and/or (iv) a note indicating whether the captured image(s) accurately reflect the photo-taking quality of the subject for whom the human-emulation was sought. Additionally, these captured image(s) are used as training data to train new artificial intelligence (AI) systems relating to training image data. More specifically, the portion of the metadata of the image(s) that indicate whether the captured image(s) is an accurate reflection of the photo-taking quality of the subject for whom the human-emulation was sought is used to label the image(s), and is subsequently used to train new AI systems relating to training image data.

III. Further Comments and/or Embodiments

Some embodiments of the present invention recognize the following facts, potential problems and/or potential areas for improvement with respect to the current state of the art: (i) finding a sufficient amount of training data for artificial intelligence (AI) systems is a challenge; (ii) a visual recognition system can be trained on hundreds of thousands of images taken by adult humans and fail to recognize a similar image taken by a child; (iii) this has given rise to generation of synthetic data; and/or (iv) however, synthetic data for image recognition has many challenges.

Some embodiments of the present invention may include one, or more, of the following features, characteristics and/or advantages: (i) learns how people take images; (ii) uses autonomous agents (such as robots) to perform the same tasks in multitude (that is, captures, by a robotically controlled synthetic image taking device, a plurality of synthetic images that have image characteristic as if the images were captured by a human having the synthetic photographer attribute values); (iii) for example, learns how a five to seven year old child takes an image (with a camera) and then provide this information (in the form of pre-programmed settings) to a robot to take images of any object needed so that the images taken by robot appear as if they were taken by a five to seven year old child; and/or (iv) the produced images can then be used to further train a visual recognition system.

Some embodiments of the present invention may include one, or more, of the following features, characteristics and/or advantages: (i) approximates childlike photography motor skills; (ii) simulates motor skills of a child by evaluating existing photos, identification of objects that would attract a child's interest; and/or (iii) simulates motor skills of a child by focusing and framing objects using limited motor skills consistent with a child.

Some embodiments of the present invention may include one, or more, of the following features, characteristics and/or advantages: (i) trains a system to simulate the taking of a photo with a specific set of user setup to make images more relatable; (ii) factors in the photo taker's biometrics; (iii) considers a host of other factors that can be simulated post processing (such as focus, exposure, and/or cropping that can be done on a given set of images in post-processing); (iv) captures how a photo was taken for the purpose of using a non-human controlled device (robot or autonomous agent) to go and take a set of photo(s) as if the human were taking the photo(s); (v) this means that if a human took a photo of an apple in one manner, the autonomous agent can go take photos of a cup in the same or similar manner (in this example, the autonomous agent is not necessarily taking photos of the same object); (vi) learns the style of a photo taker(s) so that the autonomous agent can apply this learning to other photo taking scenarios; (vii) teaches an autonomous agent to duplicate the unique photo taking style of various human photographers; and/or (viii) creates specific metadata related to the photo taking action (by the autonomous agent).

In one embodiment of the present invention, there is a system and method to develop a capability to observe and synthesize data from a diverse set of communicative devices, such as set of Internet of Things (IoT) devices 108. Developing this capability includes: (i) camera setup details at the time of photo acquisition, (ii) environmental data such as weather and geography location, (iii) physiology measurements from personal devices, and (iv) movement measurements prior to photo acquisition from personal devices and/or the camera. Once this data is collected, the data is synthesized and added to each photo as a related metadata payload that augments the substantive image data.

In one embodiment of the present invention, there is a system and method to construct an autonomous agent device (robot) that includes an analytics component. The analytics component of the autonomous agent device generates distribution-based randomized settings for each photo taking setting variant. Once these settings are calculated, the autonomous agent device: (i) configures the settings, (ii) adjusts location and framing, (iii) initiates any required movement, and (iv) captures a photo (with associated synthesized data based on the configured settings) in the same or similar manner as if a human photographer were to capture the same photo.

In one embodiment of the present invention, there is a first system and method to observe and/or obtain human motor and mechanical photo taking attributes. Data is collected related to the photo taker's characteristics and/or attributes, the individual settings used to take each photo, and annotations provided by a human reviewer.

In another embodiment of the present invention, there is a second system and method that uses the data captured in the first system to simulate the photo taker's attributes by an autonomous agent (robot) for the purpose of taking additional photos to bolster an image recognition training dataset. Here, the settings used are based on a selected subset of photos from a selected set of photo takers from the first system to drive a particular sample set.

In the first system, the photo taking attributes that are collected include, but are not necessarily limited to, the following: (i) all human motor skills (such as hand shakiness, vibration, tilt, etc.) (see FIGS. 4A and 4B); (ii) all photography device attributes (zoom, tilt, light, flash, and all other camera settings); (iii) distance from target; (iv) perspective (see FIG. 4); (v) framing; (vi) ambient lighting presence (see FIGS. 5A and 5B); and/or (vii) ambient lighting intensity (see FIGS. 5A and 5B).

Figure 4A:
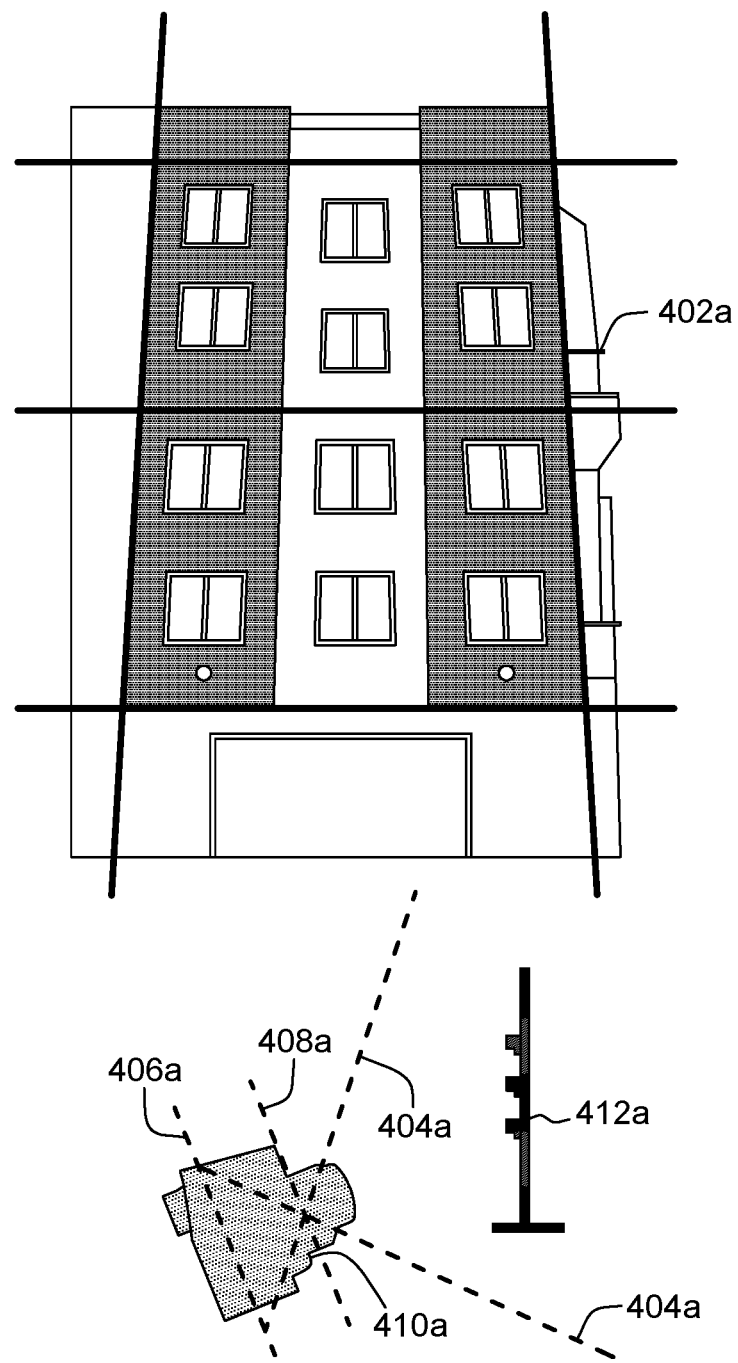
FIG. 4A is a first screenshot view generated by a second embodiment of the present invention.

FIG. 4A shows screenshot 400a of a first embodiment of the present invention. Screenshot 400a shows the following: uncorrected perspective of image 402a; field of view 404a; lens plane 406a; image plane 408a; source camera 410a; and subject 412a. As shown in screenshot 400a, source camera 410a is tilted upwards in order to frame image 402a (depicting a residential building, and with the building being represented separately as subject 412a in this example).

Figure 4B:
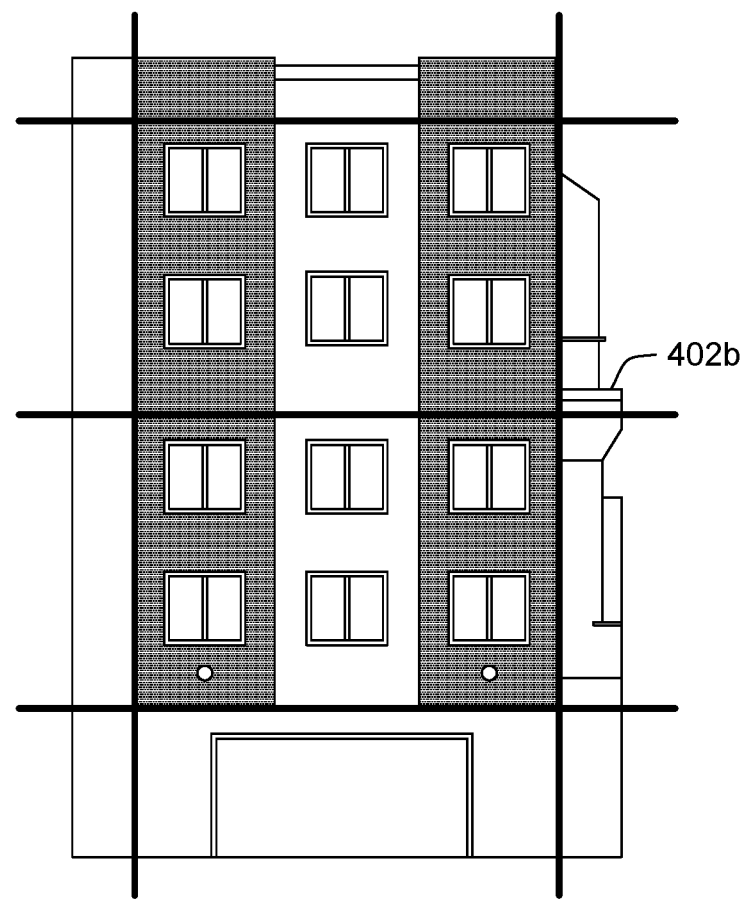
FIG. 4B is a second screenshot view generated by the second embodiment of the present invention.
Figure 4B:
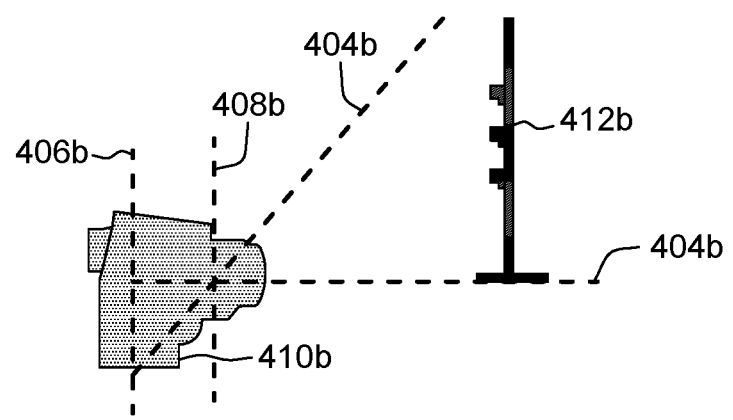

FIG. 4B shows screenshot 400b of a first embodiment of the present invention. Screenshot 400b shows the following: shifted perspective of image 402b; field of view 404b; lens plane 406b; image plane 408b; source camera 410b; and subject 412b. As shown in screenshot 400b, source camera 410b is kept parallel to image plane 408b in order to prevent distortions forming in the photo taken of image 402b (depicting a residential building, and with the residential building being represented separately as subject 412b in this example).

Figure 5A:
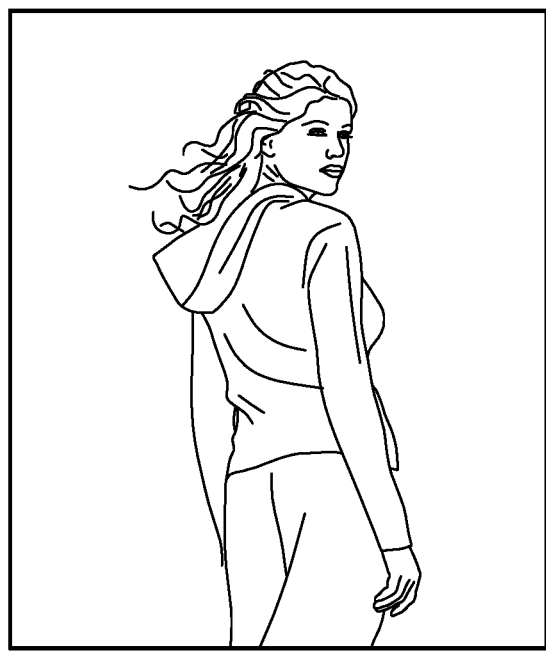
FIG. 5A is a third screenshot view generated by the second embodiment of the present invention.
Figure 5B:
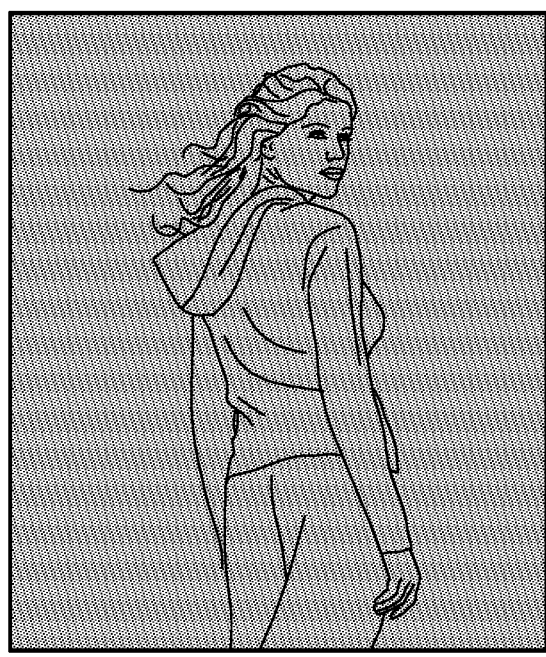
FIG. 5B is a fourth screenshot view generated by the second embodiment of the present invention.

FIG. 5A shows a screenshot of user image 500a, which is a photograph taken of a first user where the exposure settings are set so that the first user is shown with the proper amount of lighting. FIG. 5B shows a screenshot of user image 500b, which is a photograph taken of the first user where the exposure settings are set so that the first user is shown with an insufficient amount of lighting, thereby leaving user image 500b to be "underexposed."

In one embodiment of the present invention, there is a method to observe and characterize a photo taker (that is, a human photographer or an autonomous agent) and to capture the following information: (i) the photo taking mechanical and device settings, (ii) the photo taker's physical and biometric attributes (such as height, heart rate, blood pressure, "hand steadiness" factor—see FIG. 6), and (iii) the photo taker's prior motions (or actions) leading up to the moment of capturing the photo. Alternatively, there is a method to physically simulate a photo taker's captured characteristics and apply them to an autonomous agent for the purpose of taking additional photos.

Figure 6:
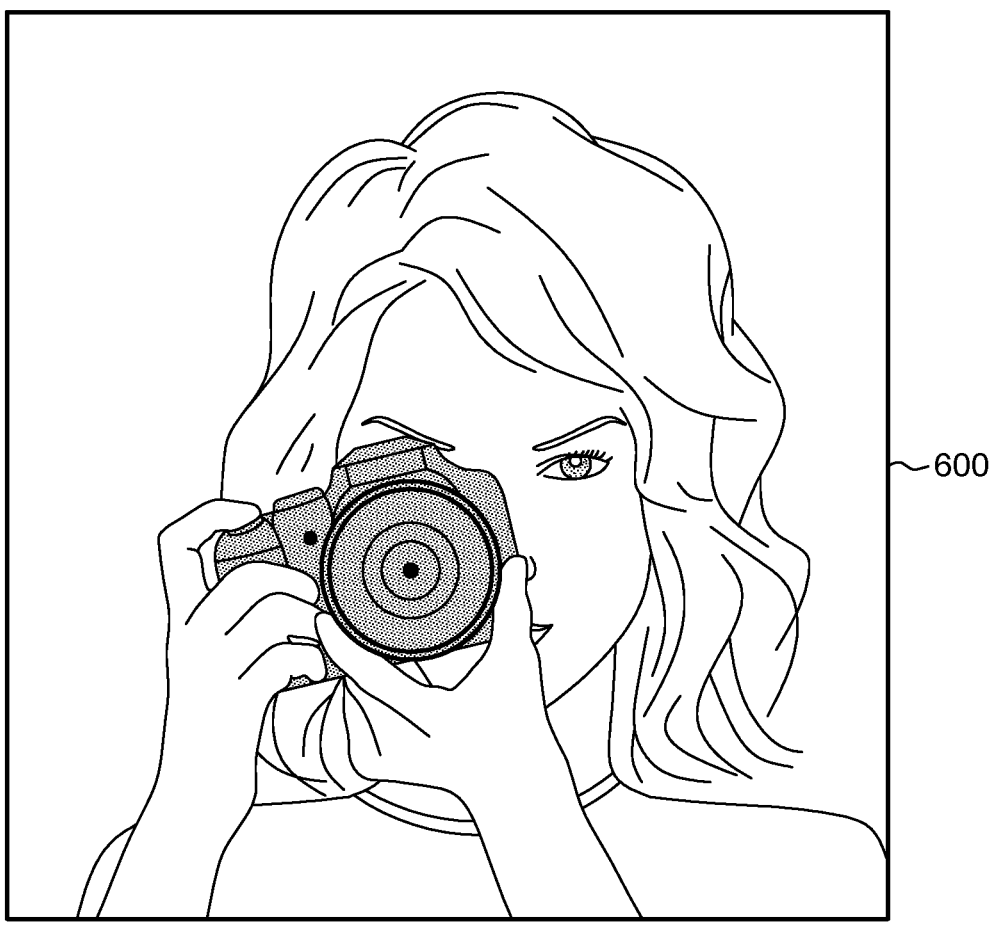
FIG. 6 is a fifth screenshot view generated by the second embodiment of the present invention.

FIG. 6 shows user image 600, which is a representation of a child taking a photograph in a manner that would most likely yield a skewed photograph (that is, the lens plane and the image plane of the camera will most likely be off-axis (not perpendicular) to the field of view of the subject of the photograph).

In one embodiment of the present invention, there is a method that performs at least the following operations (not necessarily in order): (i) collecting information about each photo taker; (ii) collecting information about the each photo taker's photo taking style; (iii) each time a photo is taken, collecting a set of data characterizing the photo taking situation (this collection can be made in real time or during post-processing of a photo depending upon the required data remaining); (iv) using human annotation to supply additional image characteristics that a machine is not capable of providing (such as frame layout—discussed in greater detail in connection with FIGS. 7A and 7B, below); and (v) for each photo taken, collecting all of the associated metadata.

Figure 7A:
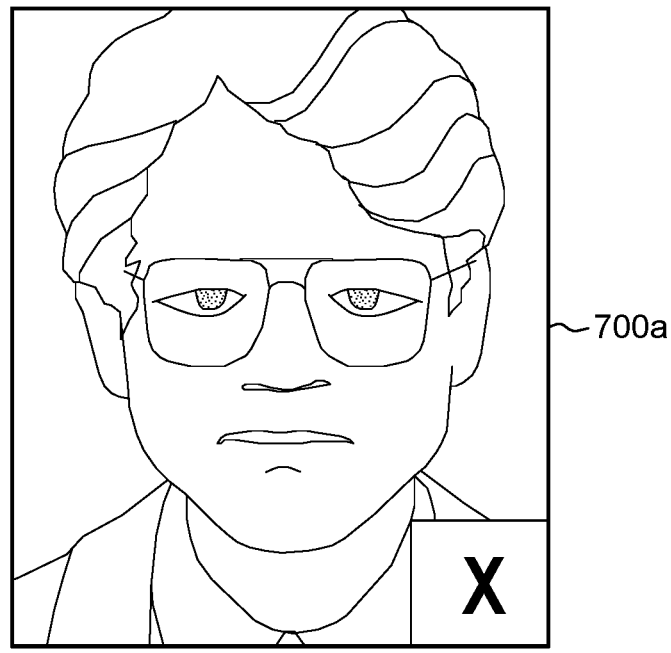
FIG. 7A is a seventh screenshot view generated by the second embodiment of the present invention.
Figure 7B:
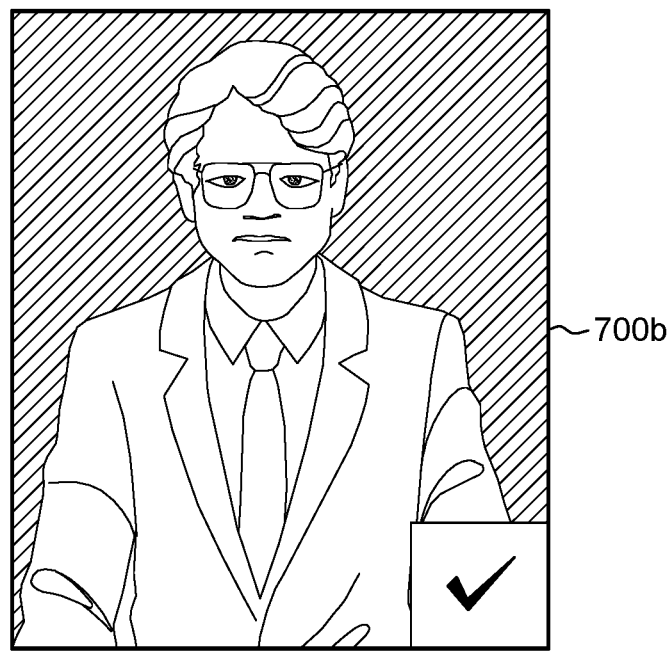
FIG. 7B is an eighth screenshot view generated by the second embodiment of the present invention.

FIG. 7A shows user image 700a, which shows a user that has not effectively framed a photograph of the subject and has cut off too much of the subject and the background. FIG. 7B shows user image 700b, which shows the subject of the photograph properly framed and effectively demonstrates the baroque effect (or photo blur effect) of the background.

According to this method, a photo taker (typically, a human photographer in this example) provides demographic information about himself or herself (such as age range, height range, place of residence, etc.). Additionally, certain information relating to the taking of the photo(s) is collected, including but not necessarily limited to the following: photo taking device, vibration, zoom, mobile applications (or categories of applications) installed on a mobile device, smart watches, and/or other human wearable devices.

According to this method, camera positioning information is collected using sensors that are onboard the camera that identifies the physical position of the camera (such as side-to-side tilt and forward/backward slant). Camera settings are manually or automatically configured, and include: aperture, ISO (International Organization for Standardization), shutter speed, white balance, autofocus, drive mode, metering, image quality, etc. Additionally, recent movement history of the camera is determined based on accelerometer data and/or physical positioning reading. Further, biometrics information of the photo taker is determined (typically, by means of a smart watch, smart phone, or any other device that is structured and configured to collect and transmit biometric information of a human user).

In some embodiments, collected photos grouped (clustered) into categories based on the metadata associated with each given photo of the collected photos. In one example, all photos taken by people of ages five to seven years old are grouped together into categories. In this example, the age range of the photo taker (five to seven years old) is the metadata that is associated with the collected photos. This metadata can be used to create a statistical distribution for the age range of the photo taker (five to seven years old in this example) in order to drive the picture taking behaviors of the autonomous agent (such as autonomous photography robot 104). Alternatively, metadata associated with the collected photos includes all of the information related to the picture-taking characteristics of each collected photo. In this example, the metadata associated with each collected photo includes: angle of the photo, focus, framing, etc.

In another embodiment of the present invention, there is a method to physically simulate a photo taker's captured characteristics and apply them to an autonomous agent (robot) for the purpose of taking additional photos.

This method includes at least the following operations (not necessarily in order): (i) selecting, by a user, the criteria for collecting additional photos (such as: "simulate ages five to seven years old"); (ii) identifying a group of objects that will be photographed; (iii) directing the autonomous agent (robot) to an object or objects to photograph; (iv) identifying the object or objects to be photographed; (v) retaining the metadata of the objects for subsequent photographs; (vi) providing all of the mechanical photo taking attributes needed for the robot to take pictures representing the criteria set in operation (i); (vii) for each given attribute, calculating, by the robot, an attribute value(s) based on statistical distribution discovered for the target picture criteria (for example, the robot could: (a) take absolute values, such as the exact attribute settings of a first user in age group five to seven years old), or (b) generate combinations of all the attributes and take pictures based on each given attribute; (viii) after calculating the attribute value(s), adjusting, by the robot, the camera settings and positioning to simulate a sample human photo taker; and/or (ix) taking, by the robot, a plurality of photographs as needed with the camera settings (identified above). Each photograph is labeled with the criteria that was used to take the photograph and whether the photograph was taken by a robot or a human. The additionally generated data can be used to provide better training data coverage for a visual recognition system.

According to this method, in order to direct the robot to an object or objects to photograph, the following actions can be taken: (i) having a human operator specify the object to be photographed; (ii) automatically identifying an object within a pre-defined space; (iii) manually placing an item in the field of photography; and/or (iv) placing invisible markings surrounding an object to be photographed.

According to this method, identifying the object(s) to be photographed and retaining its metadata is done based on: (i) operator input; (ii) artificial intelligence or cognitive visual object recognition; (iii) barcode scanning; and/or (iv) sensor based discovery such as radio-frequency identification (RFID) or Internet of Things (IoT) communication.

Additionally, adjusting the camera settings takes into account usage movement (that is, the natural movement of the camera in the hands of a given user belonging to a particular group—such as a five to seven year old child) to simulate the natural hand motions of a human user. Simulation of tilt, angle of observation (of the object to be photographed) and other items will leverage camera and/or drone positioning. Finally, the camera settings are configured to a specific attribute value. In one embodiment of the present invention, the autonomous agent is re-configured multiple times with the various camera settings in order to generate a variety of photographs of multiple objects that reflect all possible combinations of camera settings and objects to be photographed. In doing so, a large and useful set of image training data can be generated in an efficient manner.

In one embodiment of the present invention, there is a method that performs the following operations (not necessarily in order): (i) receiving a human-captured image data set including: (a) a plurality of human-captured images, and (b) for each image of the plurality of human-captured images a plurality of respectively corresponding photographer attribute values (for example, age, vision attributes, height, heart rate, blood pressure, "hand steadiness" factor, education level, income level, geographic region) associated with a human photographer that captured the respectively corresponding image; (ii) analyzing, by machine logic, the image data set to determine a plurality of correlations between photographer attribute values and image characteristics (for example, image exposure, image focus, image composition, image steadiness, image color settings); (iii) receiving a synthetic images request, with the request including data indicative of a plurality of synthetic photographer attribute values; and/or (iv) capturing, by a robotically controlled synthetic image taking device, a plurality of synthetic images that have image characteristics as if the images were captured by a human having the synthetic photographer attribute values by using the plurality of correlations between photographer attribute values and image characteristics obtained from the human-captured image data set.

According to this method, the human-captured images are still images and the synthetic images are still images. Alternatively, the human-captured images are video images and the synthetic images are video images.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A computer-implemented method (CIM) comprising:
    receiving a class information data set including information indicative of a set of personal characteristic parameter value range(s) for a class of humans, with the personal characteristic parameter value range(s) respectively corresponding to a plurality of personal characteristic parameters;
    receiving a photographic images data set including: (i) a plurality of photographic images captured by human(s), and (ii) for each given photographic image, a set of personal characteristic parameter value(s) characterizing the photographer who captured the given photographic image;
    selecting a plurality of training images from the plurality of photographic images, with the selection being based upon the personal characteristic parameter value range(s) and the personal characteristic parameter value(s) respectively associated with the photographic images;
    generating human-emulating machine logic for controlling a photographic robot to capture human-emulating photographic images that emulate photographs that would tend to be taken by humans characterized by the personal characteristic parameter value range(s);
    configuring the photographic robot with the human-emulating machine logic; and
    capturing, by photographic robot, a first human-emulating photographic image under control of the human-emulating machine logic.

2. The CIM of claim 1 wherein the human-emulating machine logic causes the first photographic image to emulate a photograph that would tend to be taken by humans characterized by the personal characteristic parameter value range(s) of the humans.

3. The CIM of claim 1 wherein the metadata of the first human-emulating photographic image is used as a part of an image training data set to train an artificial intelligence (AI) system relating to training image data.

4. The CIM of claim 1 wherein metadata is created for the first human-emulating photographic image.

5. The CIM of claim 4 wherein the metadata includes information indicative of: (i) the time that the human-emulating photographic image was taken, and (ii) the location where the human-emulating photographic image was taken.

6. The CIM of claim 4 wherein the metadata includes information indicative of whether the human-emulating photographic image is an accurate reflection of the photo-taking quality of the humans characterized by the personal characteristic parameter value range(s) of the humans.

7. A computer program product (CPP) comprising:
    a machine readable storage device; and
    computer code stored on the machine readable storage device, with the computer code including instructions and data to cause a processor(s) set to perform operations including the following:
    receiving a class information data set including information indicative of a set of personal characteristic parameter value range(s) for a class of humans, with the personal characteristic parameter value range(s) respectively corresponding to a plurality of personal characteristic parameters,
    receiving a photographic images data set including: (i) a plurality of photographic images captured by human(s), and (ii) for each given photographic image, a set of personal characteristic parameter value(s) characterizing the photographer who captured the given photographic image,
    selecting a plurality of training images from the plurality of photographic images, with the selection being based upon the personal characteristic parameter value range(s) and the personal characteristic parameter value(s) respectively associated with the photographic images,
    generating human-emulating machine logic for controlling a photographic robot to capture human-emulating photographic images that emulate photographs that would tend to be taken by humans characterized by the personal characteristic parameter value range(s),
    configuring the photographic robot with the human-emulating machine logic, and
    capturing, by photographic robot, a first human-emulating photographic image under control of the human-emulating machine logic.

8. The CPP of claim 7 wherein the human-emulating machine logic causes the first photographic image to emulate a photograph that would tend to be taken by humans characterized by the personal characteristic parameter value range(s) of the humans.

9. The CPP of claim 7 wherein the metadata of the first human-emulating photographic image is used as a part of an image training data set to train an artificial intelligence (AI) system relating to training image data.

10. The CPP of claim 7 wherein metadata is created for the first human-emulating photographic image.

11. The CPP of claim 10 wherein the metadata includes information indicative of: (i) the time that the human-emulating photographic image was taken, and (ii) the location where the human-emulating photographic image was taken.

12. The CPP of claim 10 wherein the metadata includes information indicative of whether the human-emulating photographic image is an accurate reflection of the photo-taking quality of the humans characterized by the personal characteristic parameter value range(s) of the humans.

13. A computer system (CS) comprising:
    a processor(s) set;
    a machine readable storage device; and
    computer code stored on the machine readable storage device, with the computer code including instructions and data to cause the processor(s) set to perform operations including the following:
    receiving a class information data set including information indicative of a set of personal characteristic parameter value range(s) for a class of humans, with the personal characteristic parameter value range(s) respectively corresponding to a plurality of personal characteristic parameters, receiving a photographic images data set including: (i) a plurality of photographic images captured by human(s), and (ii) for each given photographic image, a set of personal characteristic parameter value(s) characterizing the photographer who captured the given photographic image, selecting a plurality of training images from the plurality of photographic images, with the selection being based upon the personal characteristic parameter value range(s) and the personal characteristic parameter value(s) respectively associated with the photographic images, generating human-emulating machine logic for controlling a photographic robot to capture human-emulating photographic images that emulate photographs that would tend to be taken by humans characterized by the personal characteristic parameter value range(s), configuring the photographic robot with the human-emulating machine logic, and capturing, by photographic robot, a first human-emulating photographic image under control of the human-emulating machine logic.

14. The CS of claim 13 wherein the human-emulating machine logic causes the first photographic image to emulate a photograph that would tend to be taken by humans characterized by the personal characteristic parameter value range(s) of the humans.

15. The CS of claim 13 wherein the metadata of the first human-emulating photographic image is used as a part of an image training data set to train an artificial intelligence (AI) system relating to training image data.

16. The CS of claim 13 wherein metadata is created for the first human-emulating photographic image.

17. The CS of claim 16 wherein the metadata includes information indicative of: (i) the time that the human-emulating photographic image was taken, and (ii) the location where the human-emulating photographic image was taken.

18. The CS of claim 16 wherein the metadata includes information indicative of whether the human-emulating photographic image is an accurate reflection of the photo-taking quality of the humans characterized by the personal characteristic parameter value range(s) of the humans.

* * * * *